Dec. 8, 1970  N. A. FISCHER ET AL  3,545,036
TOWNSEND SKINNER KNUCKLE BONE REMOVER

Filed March 6, 1969  2 Sheets-Sheet 1

INVENTORS
NATHAN A. FISCHER,
GEORGE W. HARDWICK
BY Williamson, Palmatier
& Bains
ATTORNEY

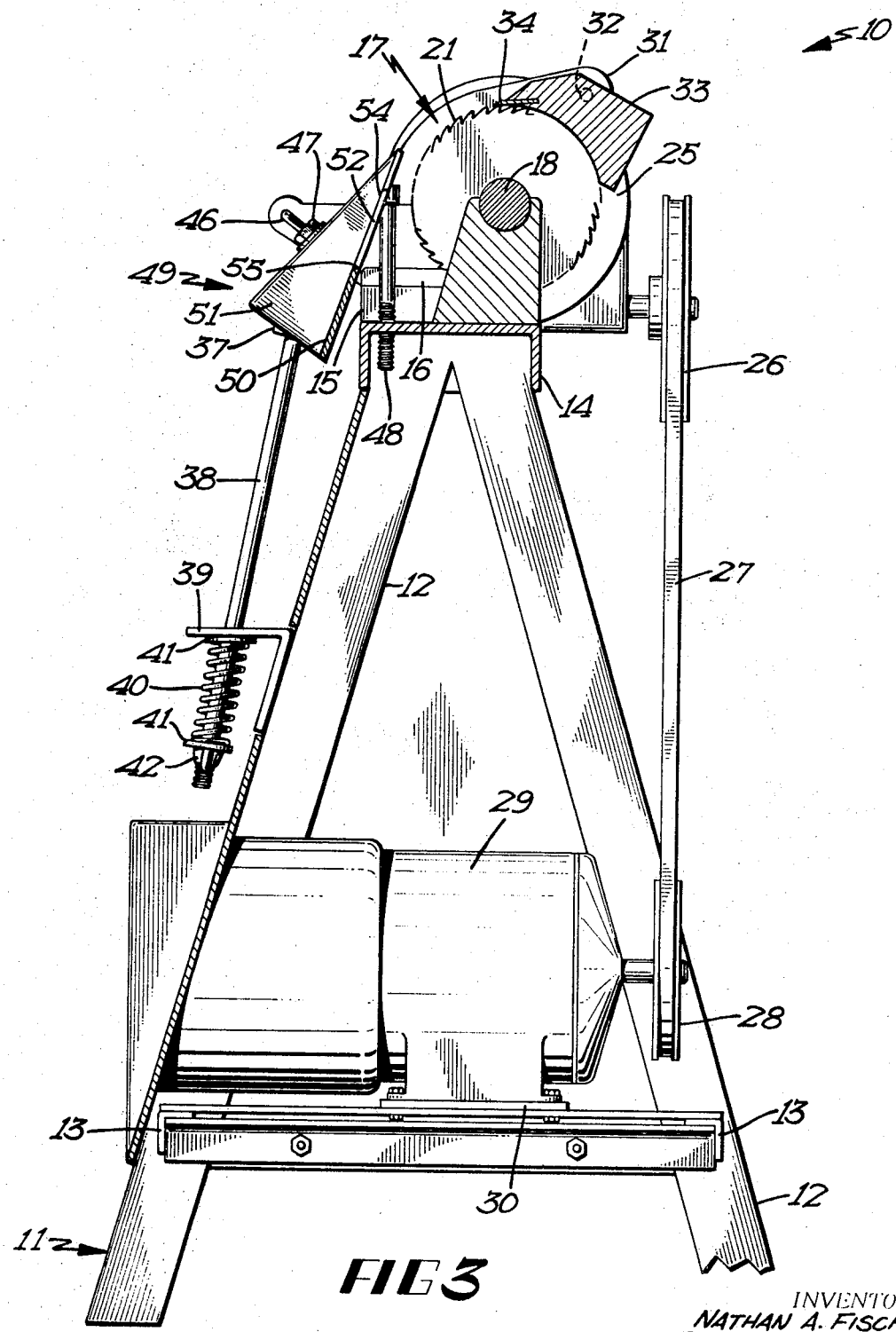

United States Patent Office 3,545,036
Patented Dec. 8, 1970

3,545,036
TOWNSEND SKINNER KNUCKLE BONE REMOVER
Nathan A. Fischer and George W. Hardwick, Austin, Minn., assignors to Geo. A. Hormel & Company, Austin, Minn., a corporation of Delaware
Filed Mar. 6, 1969, Ser. No. 804,862
Int. Cl. A22c 17/04, 17/12
U.S. Cl. 17—1                                   5 Claims

ABSTRACT OF THE DISCLOSURE

A skinning machine for removing skin from hams includes a driven roll mounted on a frame, the roll including first and second sets of serrated blades which are axially spaced apart. A plurality of stripper elements are positioned between adjacent blades of each set, and a pressure shoe having a skinning blade is positioned closely adjacent the driven roll. An elongate substantially flat guard member is also positioned closely adjacent the roll and is spaced from the pressure shoe, and includes a U-shaped portion which includes a substantially flat web disposed substantially parallel to the general plane of the guard member. The flat web is provided with a notch therein including a portion thereof slightly larger than the space between the two sets of blades thereby permitting insertion of the knuckle bone of a ham through the notch for engagement by the adjacent blades of the two sets and cooperating with the skinning blade to facilitate ready removal of the knuckle bone.

SUMMARY OF THE INVENTION

One of the steps involved in the processing of hams is the removal of the skin from the hams. During the skinning operation, the knuckle bone of the ham is also removed as well as the lymph glands located in the general vicinity of the knuckle bone. Although there are commercially available skinning machines available, these machines while permitting the ready removal of the skin from the ham do not make provision for removal of the knuckle bone. Heretofore, the removal of the knuckle bone from the ham involves a completely manual operation which is time consuming and dependent upon the skill of a manual operator.

It is therefore an object of this invention to provide a skinning machine used in the removal of skin from hams with means for removing the knuckle bone from the ham thereby permitting an operator to very quickly and easily remove the knuckle bone from the ham during the skin removing operation.

A more specific object of this invention is the provision in a conventional ham skinning machine with the knuckle bone removing means which includes a driven roll having two axially spaced apart sets of serrated blades which cooperate with a skinning knife and a guard member to permit effective removal of the knuckle bone as a preliminary step in the removal of the skin from the ham.

These and other objects and advantages of this invention will more fully appear from the following description made in connection with the accompanying drawings wherein like reference characters refer to the same or similar parts throughout the several views.

BRIEF DESCRIPTION OF THE FIGURES OF THE DRAWING

FIG. 3 is a cross-sectional view taken approximately along line 3—3 of FIG. 2 and looking in the direction of the arrows.

DETAILED DESCRIPTION OF THE INVENTION

Figure 1:
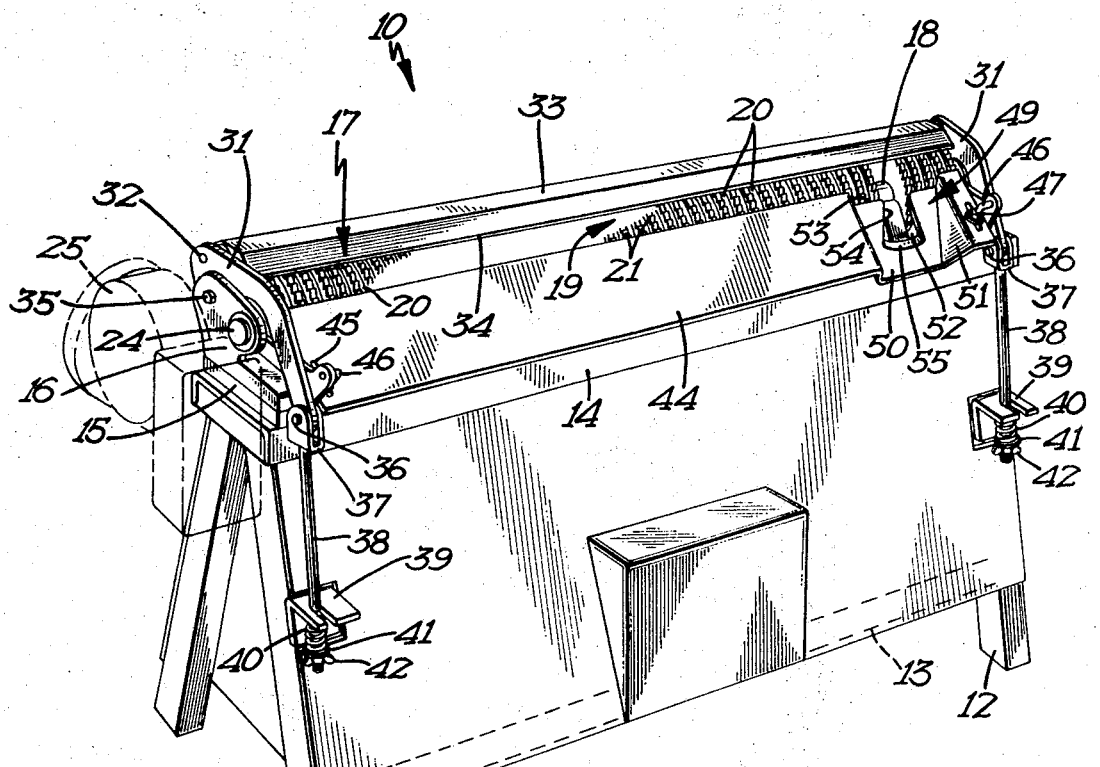
FIG. 1 is a perspective view of the novel ham skinning machine.

Referring now to the drawings or specifically to FIG. 1, it will be seen that one embodiment of the novel ham skinning machine, designated generally by the reference numeral 10, is thereshown. This skinning machine 10 includes a frame 11 which is comprised of pairs of generally vertically oriented leg members 12 which are interconnected by longitudinal frame members 13. In this regard, it will be noted that the leg members 12 comprising one pair diverge downwardly from each other, and one leg member of one pair is interconnected by a longitudinal frame member 13 with a leg member of the other pair. An elongate generally channel shaped mounting member 14 is rigidly affixed to the upper ends of the leg members 12 and this mounting member is horizontally oriented.

A pair of spaced apart bearing mounts 15 are rigidly affixed to the upper surface of the mounting member 14 adjacent opposite ends thereof and each has a bearing 16 affixed thereto and projecting upwardly therefrom. An elongate horizontally oriented driven roll 17 is revolvably mounted on the frame 11 and includes an elongate shaft 18 having opposite ends thereof journalled in the bearings 16. The driven roll 17 is comprised of a generally cylindrically shaped tubular body 19 having a plurality of axially spaced apart serrated blades 20 affixed thereto and projecting radially therefrom. These blades 20 are generally circular and each has teeth 21 in the periphery thereof.

It will be noted that the driven roll 17 is arranged so that the tubular body and blades define a pair of sets or roll sections. In this regard, it will be noted that the space 22 between adjacent blades is uniform but that a larger cylindrical space 23 is defined between the two roll sections. One roll section is designated 17a and the other roll section is designated 17b. It will further be noted that the cylindrical space 23 between the section 17a and 17b is substantially larger in an axial direction than the spacing between adjacent blades, but is also larger in a radial direction than any one of the spaces 22. In this regard the cylindrical space 23 extends from the shaft 18.

One end of the shaft 18 projects beyond the adjacent bearing 16 and projects interiorly of a gear box 25 provided with a suitable gear train therein. The gear box has an output shaft which projects exteriorly thereof to which a pulley 26 is affixed. A belt 27 is trained around the pulley 26 and around a pulley 28. The pulley 28 is keyed to the output shaft of an electric motor 29 whereby when the motor 29 is energized, the driven roll 17 will be revolved. It will be noted that the electric motor 29 is mounted upon a mounting plate 30 which is adjustably secured to the longitudinal frame members 13 of the frame 11.

A pair of elongate mounting arms are each connected adjacent one end by a pivot 32 to one end of an elongate pressure shoe 33. This pressure shoe 33 has a slot therein which receives a substantially flat elongate skinning blade 34, the blade being secured to the pressure shoe by suitable bolts or the like. The cutting edge of the blade 34 actually projects forwardly from the leading edge of the pressure shoe and is disposed in close proximal relation with respect to the serrated or toothed blades 20.

In this regard, it will be noted that each mounting arm 31 is also pivotally connected by a pivot 35 to the associated bearing 16. Thus it will be seen that the arms 31 are pivotally mounted on the bearings while the pressure shoe 33 is pivotally connected to the mounting arms 31.

The pivot 35 of each arm 31 is located adjacent the pivot 32 for each arm.

The other end of each mounting arm 31 is pivotally connected by pivot 36 to the U-shaped upper end 37 of an elongate hold down bolt 38. Each of a pair of the leg members 12 has a generally L-shaped apertured bracket 39 fixedly connected thereto intermediate the ends thereof and each hold down bolt projects through the opening in the associated bracket 39. A helical spring 40 is positioned around each hold down bolt and each spring is interposed between a pair of collars 41 which are also positioned upon each hold down bolt. The uppermost collar 41 for each hold down bolt engages the associated L-shaped bracket 39 while the lowermost collar 41 of each bolt is engaged by a wing nut 42. It will be noted that with this arrangement, the pressure shoe 33 is pivotally but yieldably mounted in predetermined relation with respect to the driven roll 17.

The driven roll 17 has a plurality of similar curved stripper elements 43 positioned in the spaces 22 defined between adjacent blades 20. These stripper elements tend to strip the skin and fat from the roller during the skinning operation. In this regard, it is pointed out that the pressure shoe 33 and the stripper elements 43 are generally of the type and construction of those in the commercial ham skinning machines manufactured and sold by Townsend Engineering Company.

The skinning machine 10 also includes an elongate substatially flat guard member 44 which has a pair of elongate transversely extending slots 45 therein, each slot located adjacent one end of the guard member. A pair of L-shaped bolts 46 are provided each extending through one of the slots 45 and being secured to each guard member by a pair of nut and washer assemblies 47. The other end of each L-shaped bolt 46 projects into an aperture in the adjacent bearing 16 whereby the guard member is mounted in predetermined relation with respect to the driven roll 17. The slot and bolt connection of the guard member 44 to the bearings 16 permits relative adjustment of the guard member with respect to the driven roll.

The mounting member 14 is provided with a pair of spaced apart threaded apertures therein which accommodate a pair of threaded posts 48 which project upwardly from the mounting member. These posts 48 are engaged by the guard member 44 and cooperate with the L-shaped bolts 46 to properly orient the guard member with respect to the driven roll 17. Thus by adjusting the posts 48, and by shifting the guard member reative to the bolts 46 the position of the guard member may be adjusted with respect to the driven roll.

Figure 2:
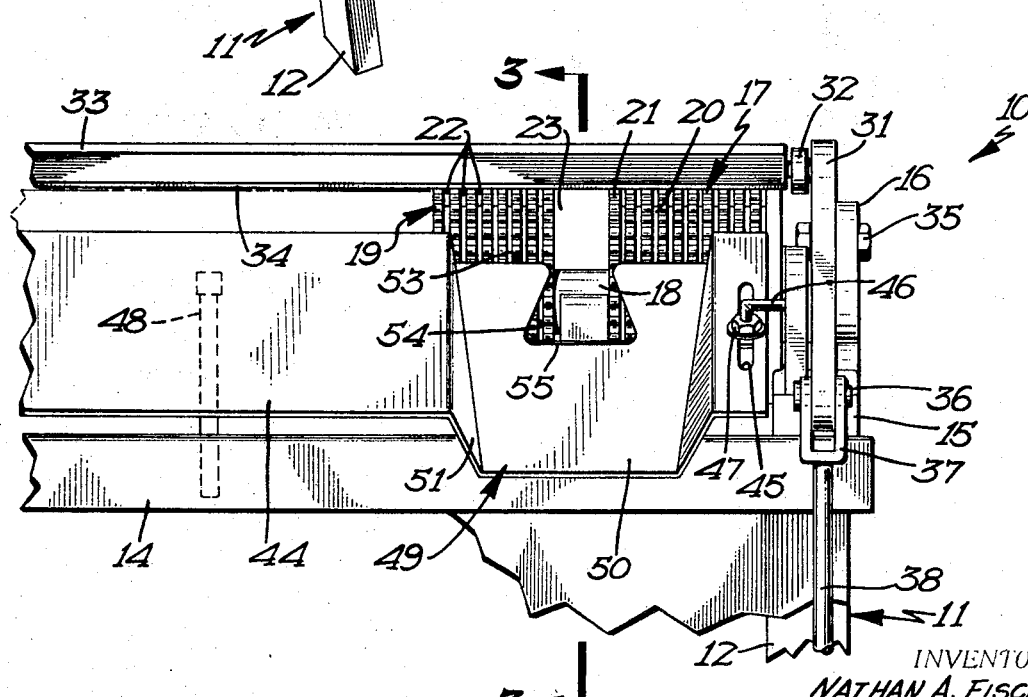
FIG. 2 is a front elevational view of a portion thereof.

The guard member 44 is also provided with a U-shaped portion 49 intermediate the ends thereof, and this U-shaped portion includes a web 50 and side walls 51. The web 50 is spaced from the general plane of the guard member and has a notch or recess 52 therein as best seen in FIG. 1. This notch is disposed in aligned relation with respect to the cylindrical space 23. It will be noted that the notch 52 extends from the upper edge 53 of the guard member and terminates generally adjacent the longitudinal center line of the guard member. The side edges 54 of the notch or recess 52 extend from the upper edge 53 and diverge away from each other and terminate in a lower edge 55. It will therefore be seen that the recess or notch 52 is of generally trapezoidal configuration with the narrow portion thereof only slightly larger than the axial dimension of the cylindrical space 23. Thus the blades 20 which are adjacent the cylindrical space 23 are exposed in the lower portion of the notch or recess 52 as best seen in FIG. 2.

With this arrangement, the notch or recess 52 is of a size larger than the knuckle bone and adjacent fat and skin which is to be removed from the ham. This permits the knuckle bone to be very effectively removed by the machine prior to the general skin removing step.

In operation, an operator will first position the ham to be skinned so that the knuckle bone projects through the larger portion of the recess 52. The U-shaped portion of the guard member facilitates positioning of the knuckle bone through the recess or notch so that the skin and fatty material adjacent the knuckle bone will be gripped by those serrated blades adjacent the cylindrical space 23. A portion of the knuckle bone will project to the cylindrical space 23 and as the operator moves the ham along the web 50 towards the blade 54, the knuckle bone and adjacent fat skin will be severed by the skinning blade 34 from the remaining portion of the ham. The teeth which engage the adjacent portions of the knuckle bone causes this severed knuckle bone to be carried by the driven roller and discharge from the skinning machine.

Thereafter, the operator will position the ham to be skinned upon the guard member so that the skin to be removed is engaged by the blade 34 and by the blades 20. An operator may very effectively remove the skin and some portions of the fat from the ham in the skinning operation by generally revolving the ham while holding the same against the blade 34.

It will be seen that the uniquely constructed driven roll 17 and guard member 44 permit effective removal of the knuckle bone, lymph nodes, skin and fat associated with the knuckle bone with the skinning machine during the skin removing operation. The U-shaped portion of the guard member permits correct positioning and insertion of the knuckle bone and adjacent tissue into the space between the roll sections while permitting the adjacent tissue to be gripped by the driven roll when the ham is urged against the skinning blade. This particular arrangement of parts eliminates the manual step involved in the removal of the knuckle bone and thereby permits the skinning operation to be carried out much quicker and certainly more effectively.

Thus it will be seen that I have provided a skinning machine with means for removing the knuckle bone during a skinning operation thereby rendering the skinning machine much more effective than comparable skinning machines.

It will, of course, be understood that various changes may be made in the form, details, arrangement and proportions of the various parts without departing from the scope of my invention.

What is claimed is:
1. A skinning machine comprising
   a frame,
   a driven roll including an elongate shaft journalled on said frame, a cylindrical body on said shaft, a plurality of axially spaced apart generally circular serrated radial blades on said cylindrical body extending radially outwardly therefrom, said tubular body and blades being arranged into a pair of sections spaced axially apart along said shaft, the blades of each section being uniformly spaced apart with respect to each other and the cylindrical space between the sections having an axial dimension substantially greater than the distance between adjacent blades of one of said sections,
   a plurality of elongate generally curved stripper elements positioned between adjacent blades of each of said sections,
   a pressure shoe positioned in close proximal relation to said roll and having a leading edge,
   a skinning blade projecting from said leading edge,
   an elongate substantially flat guard member disposed in close proximal relation to said driven roll, said guard member including a U-shaped portion intermediate the ends thereof, said U-shaped portion including a substantially flat web disposed in spaced relation with respect to the general plane of said guard member,
   said web having a notch therein disposed in close proximal aligned relation with the cylindrical space defined between said sections, said notch having a transverse dimension corresponding generally to the axial dimension of the cylindrical space whereby a knuckle bone and adjacent skin of a ham may be inserted into said notch and cylindrical space to permit removal of the knuckle bone by the coaction between the skinning blade and said radial blades.

2. The skinning machine as defined in claim 1 wherein one of said roll sections has an axial dimension substantially larger than the axial dimension of the other of said sections.

3. The skinning machine as defined in claim 1 wherein the transverse dimension of the notch in said web of the guard member is slightly larger than the axial dimension of the cylindrical space between said sections.

4. The skinning machine as defined in claim 3 wherein said notch is of trapezoidal configuration.

5. The skinning machine as defined in claim 1 wherein said cylindrical space between said sections extends radially outwardly from the shaft of said driven roll.

References Cited
UNITED STATES PATENTS

| | | | |
|---|---|---|---|
| 1,759,478 | 5/1930 | Bergstrom | 17—21UX |
| 2,715,427 | 8/1955 | Townsend | 146—130 |
| 2,912,027 | 11/1959 | Townsend | 146—130 |
| 3,457,586 | 7/1969 | Zwiep et al. | 17—1 |

LUCIE H. LAUDENSLAGER, Primary Examiner

U.S. Cl. XR
17—21; 146—130